P. V. VERNON.
SAW FOR CUTTING METALS.
APPLICATION FILED OCT. 30, 1919.
1,423,504.
Patented July 18, 1922.
5 SHEETS—SHEET 1.
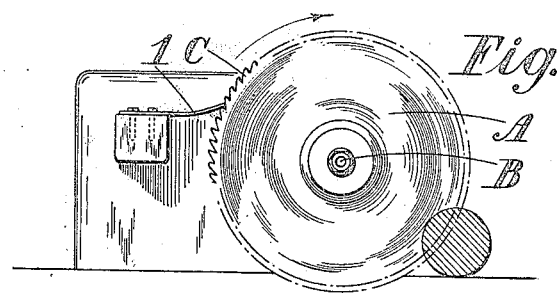
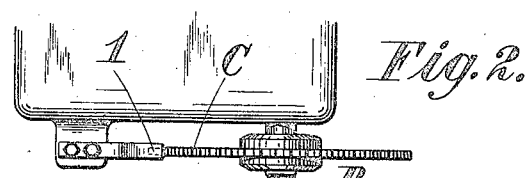
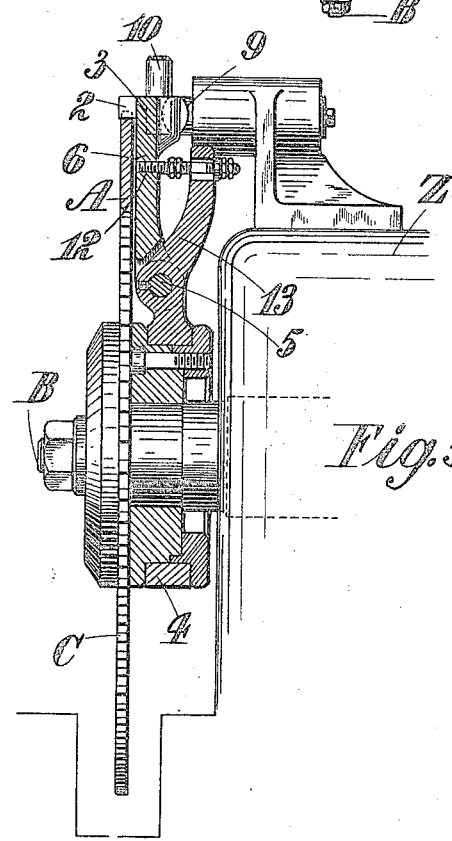
Inventor:
Percy Venable Vernon,
by Alfred ...
att.

P. V. VERNON.
SAW FOR CUTTING METALS.
APPLICATION FILED OCT. 30, 1919.

1,423,504.

Patented July 18, 1922.
5 SHEETS—SHEET 2.

Inventor:
Percy Venable Vernon

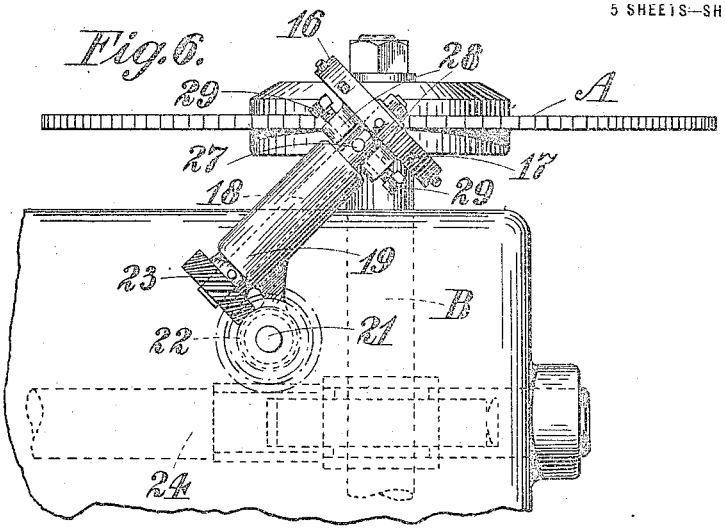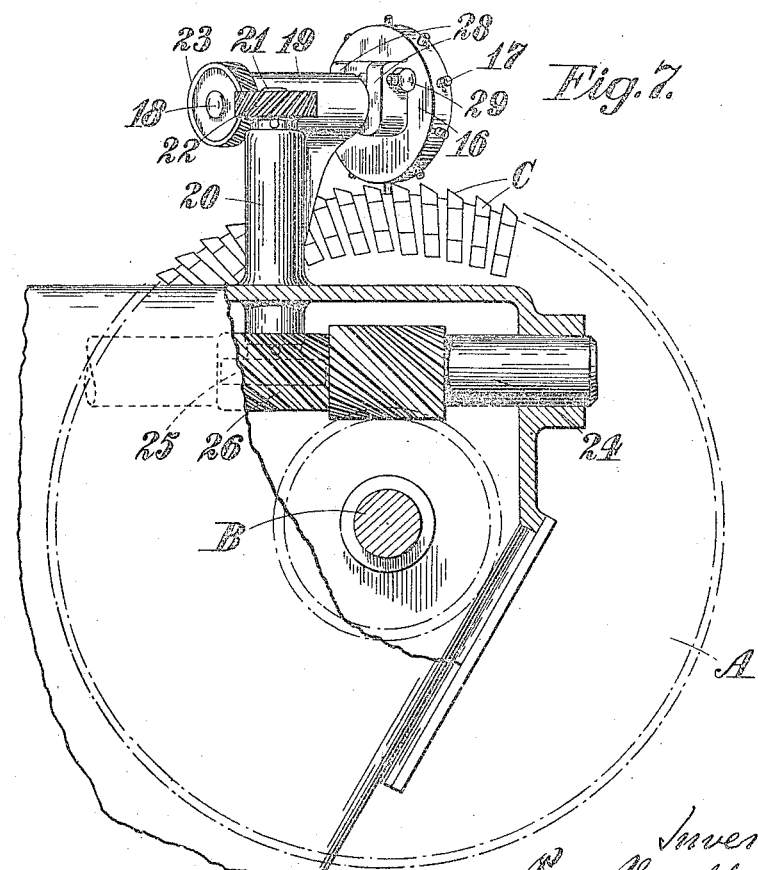

P. V. VERNON.
SAW FOR CUTTING METALS.
APPLICATION FILED OCT. 30, 1919.
1,423,504.
Patented July 18, 1922.
5 SHEETS—SHEET 5.
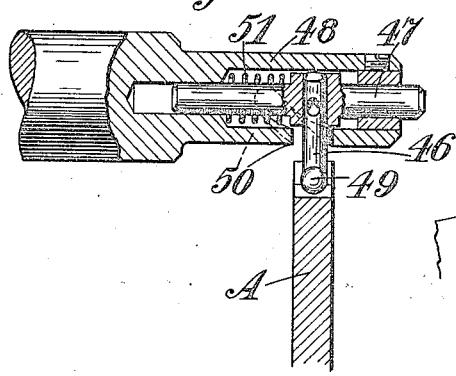
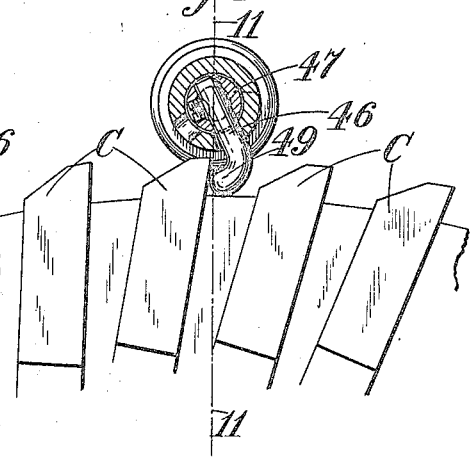
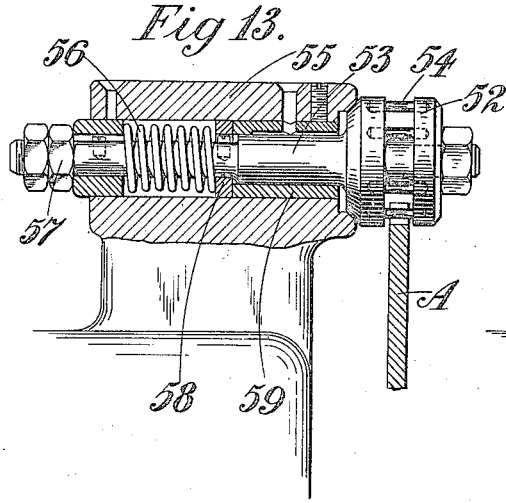
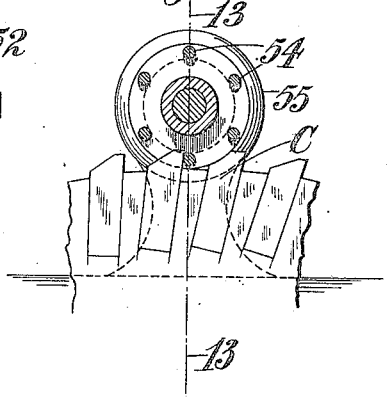
Inventor:
Percy Venable Vernon

UNITED STATES PATENT OFFICE.

PERCY VENABLES VERNON, OF KERESLEY, ENGLAND.

SAW FOR CUTTING METALS.

1,423,504.  Specification of Letters Patent.  Patented July 18, 1922.

Application filed October 30, 1919. Serial No. 334,505.

*To all whom it may concern:*

Be it known that I, PERCY VENABLES VERNON, a subject of the King of England, residing at Keresley, in the county of Warwick, England, have invented certain new and useful Improvements in Saws for Cutting Metals, of which the following is a specification.

This invention relates to saws for cutting metal, more particularly to those of the circular type, and it has for its object to provide simple means whereby the metal chips, which adhere to the cutting teeth and reduce their cutting efficiency, may be removed.

According to this invention, this is effected by a member adapted to enter the spaces between the saw teeth and to move across or along the cutting faces of the teeth so as thereby to traverse such faces and to clear them of chips.

The member may be of single or multiple form, and may comprise a revolving disc, or the like, with projections which are adapted to enter and clear of chips the tooth spaces of the saw.

The movements of the chip-removing member may be derived from the movements of the saw, and in one case, the aforesaid member may consist of a toothed-wheel whose rotational axis may or may not be at an angle to that of the circular saw, (for example, at right angles) and whose teeth mate with those of the saw. This wheel derives its motion from the saw, its teeth entering and leaving the saw-teeth spaces by a lateral movement.

In the accompanying drawings,

Figure 1 is a side elevation, and

Figure 2 a plan showing an existing and known method adopted for removing chips from saw teeth.

Figue 3 is a side elevation with the saw partly broken away, showing one method of carrying out this invention.

Figure 4 is a plan of the same partly in section, and

Figure 5 a central vertical section of the same through the saw axis.

Figure 6 is a plan of an alternative of which

Figure 7 is a side elevation partly in section,

Figure 8 is a plan of another alternative of which

Figure 10 shows a further alternative in side elevation partly in section of which—

Figure 11 is a section on the line 11—11.

Figure 12 is a side elevation partly in section of another alternative, and

Figure 13 is a section on the line 13—13 of Figure 12.

Throughout the drawings the saw is indicated at A with its axis at B and teeth at C.

In the known construction shown in Figures 1 and 2 the saw teeth C are engaged by a spring blade 1 which clicks against the saw teeth as the saw revolves and may remove such of the chips as project beyond the periphery of the saw. This device is of limited efficiency and differs from the present invention in that the chip clearing member in the latter case is moved into the tooth space and across or along the cutting face of the tooth and so traverses the cutting face of each tooth.

Figure 3:
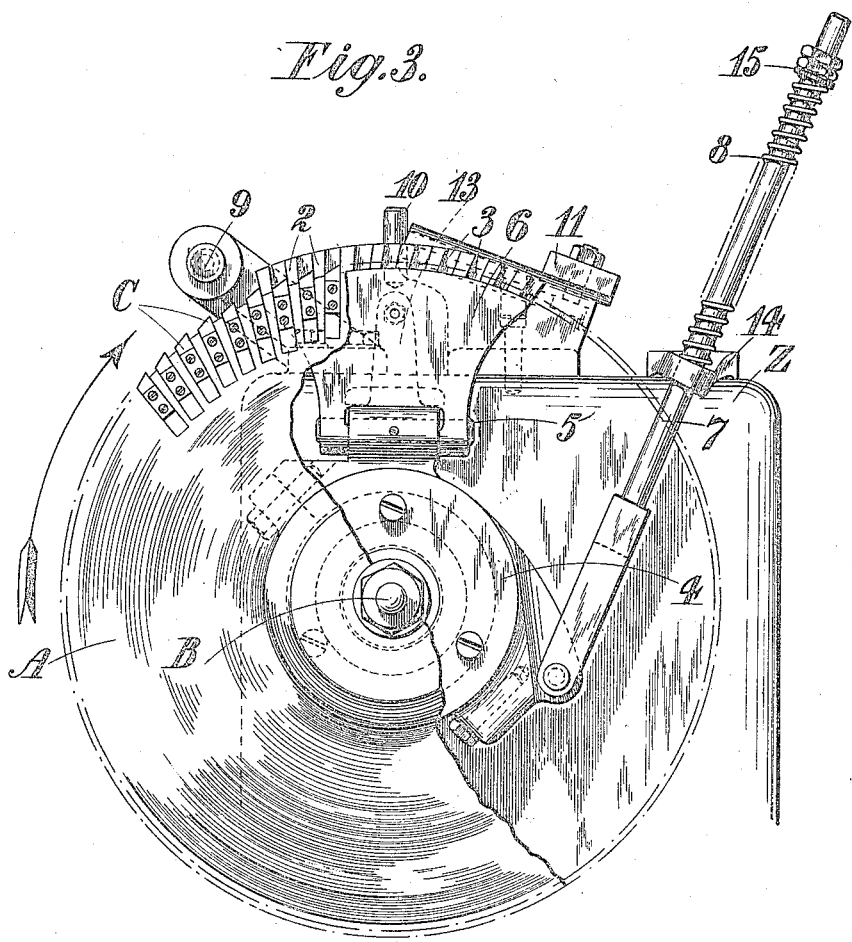
Figure 4:
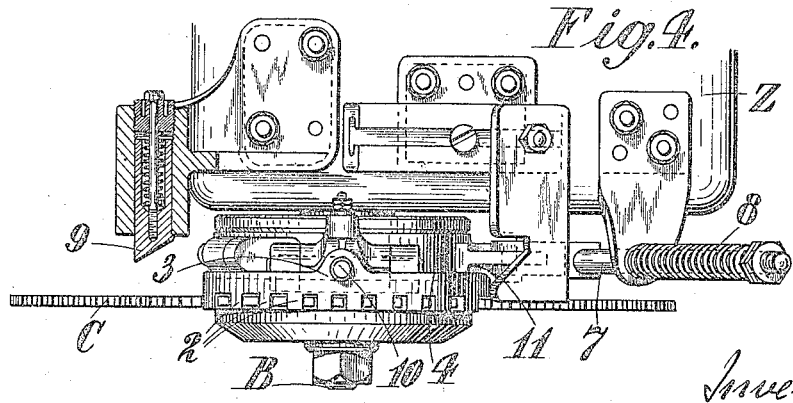

This is clearly shown in the first embodiment of the invention shown in Figures 3, 4 and 5. In this case a number of projections 2 forming a curved comb 3 enter the saw teeth spaces. The comb 3 is angularly reciprocable about the saw-axis B, and is also laterally movable with reference to the plane of the saw to cause the projections 2 to enter or be withdrawn from the respective saw-teeth spaces.

A collar 4 loosely mounted around the saw-spindle B, but endwise fast has, at its periphery, a hinge-joint 5 by means of which a plate 6 substantially parallel to the saw is hinged to move at its free end towards or away from the periphery of the saw. This plate carries the comb 3 the projections 2 of which are spaced apart to agree with the saw-tooth spaces. When the projections engage the saw teeth the plate and comb move round with the saw, and when withdrawn therefrom by movement on its hinge-axis, it can be brought back to its starting point, to engage others of the saw teeth.

To accomplish this, a resilient member, such as the rod 7 acted upon by the spring 8, acting on the loosely mounted collar 4 tends always to return it with the comb 3 to an initial starting position, where a spring actuated plunger 9, or like device, bears on a peg 10 carried by the comb to push it towards the saw A. In the latter movement the projections 2 enter the spaces between the saw teeth and move across the cutting faces of the teeth to clear them, and the comb being then interlocked with the saw, travels around with it in the direction of the arrow in Figure 3, and strains the aforesaid resilient members 7 and 8. A cam plate 11, conveniently formed by an inclined plane is mounted on the saw-bed Z and so situated as to engage the peg 10 so as to tilt the plate 6 about its hinge 5 and withdraw the projections 2 from the tooth spaces after a pre-determined angular movement of the plate about the saw axis.

When thus released the spring 8 brings the collar, plate and projections back to the starting point, and these movements are continuously repeated as long as the saw is working. Obviously, however, means may be provided for holding the plate out of engagement of the moving saw when desirable. This may take the form of the screw 12 projecting from the plate 6 and provided with stop nuts engaging the sides of the arm 13 integral with the collar 4.

The cam plate 11 which acts to withdraw the projections 2 from the saw-teeth may be adjustable to any desired position around the saw, to vary the angular magnitude of the movements which the projections make. Such variations are conveniently provided for by the rod 7 which is hinged at one end to the collar 4 to turn in the latter's rotational plane, and guided at its free part, by the guide 14, the helical spring 8 being situated between the guide and adjusting nuts 15 provided on the rod. The spring 8 can thus be loaded to suit the speed of the saw and the angular movement of the comb 3.

In the construction shewn in Figures 6 and 7, the chip-clearing device is in the form of a disc 16, the plane of which intersects that of the saw A, for example at 45°. This disc is located in close proximity to the saw and is provided with teeth in the form of radially disposed projections 17 which are adapted to successively enter the saw spaces and to move across the cutting faces of the teeth to clear them.

The disc 16 is carried on a spindle 18 rotatably mounted in an arm 19 carried by a pillar 20. A vertical shaft 21 rotates in the pillar, and by spiral gears 22, 23, at its upper end actuates the spindle 18 and disc 16. At its lower end the shaft 21 derives its motion from the main driving shaft 24 through spiral gears 25, 26.

An important feature of this arrangement is the provision of means for angularly adjusting the position of the disc 16 on the shaft 18, to accurately "time" (i. e., advance or retard) the passage of the projections 17 through the spaces between the saw teeth. This ensures their effective action without binding, or colliding with the sides of the teeth. The means referred to comprise a radially disposed pin 27 in the shaft 18 situated between lugs 28 on the disc 16. In these lugs are set screws 29 which bear on opposite sides of the pin 27 and are tangentially disposed to the shaft 18. The disc is normally free angularly on the shaft 18 and the set screws 29 bearing on the pin 27 act both to lock the disc to the shaft and to allow of its angular adjustment thereon.

It will be seen that the motion of the projections on the disc may be resolved into two components one in the plane of rotation of the saw and the other at right angles to that plane. The component in the plane of the saw is such as to maintain the teeth in "time" or "in gear" with the saw teeth, and the component at right angles to the plane of rotation of the saw causes the projections on the disc to move across the cutting faces of the teeth to clear them.

Figure 8:
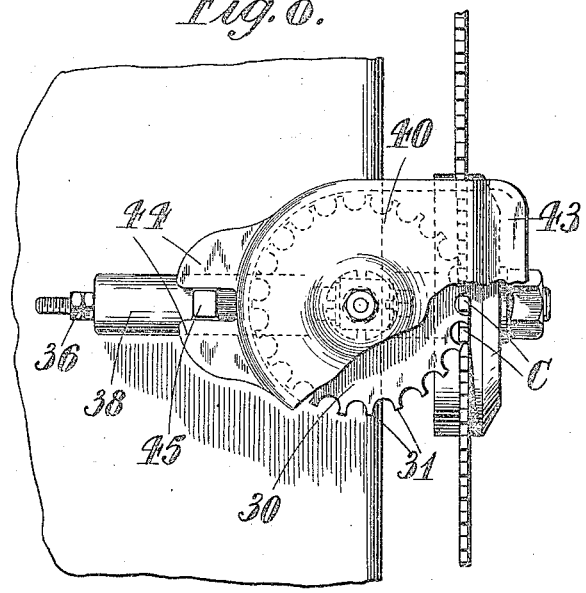
Figure 9:
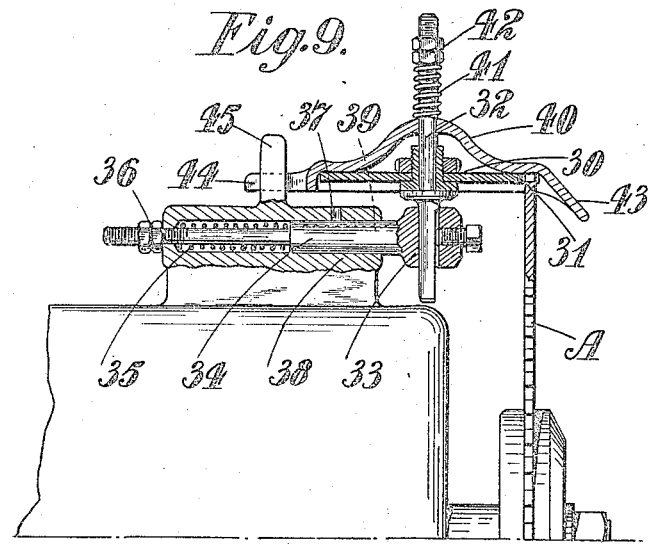
Figure 9 is an elevation partly in section.

In the modification shewn in Figures 8 and 9 an exceedingly simple and effective device is employed, comprising a disc 30, preferably of case-hardened steel, and provided on its periphery with teeth 31 which advantageously may be of a shape substantially as indicated, (i. e., formed by undercut notches in the rim of the disc, so that the points of the teeth are wider circumferentially than their shanks).

The disc 30 is mounted to rotate on an axle 32 which intersects the saw-axis B at any suitable angle, and its teeth 31 mesh with the saw-teeth C, so that the saw thereby causes it to rotate. The axle 32 is endwise adjustable in a boss 33 at the end of a plunger 34 parallel with the saw axis B and pressed by a spring 35 towards the saw A. Check nuts 36 are adapted to limit the movement of the plunger 34 towards the saw, and a feather 37 in the plunger guide 38 engages a featherway 39 in the plunger to prevent its rotation in the guide. Thus by means of the axle 32 the disc 30 can be positioned to suit various diameters of saws, and by means of the adjusting nuts 36 on the plunger 34 can have the depth of engagement of its teeth varied at will. The purpose of the spring 35 is to prevent damage if any jamming should accidentally occur.

A guard 40 is mounted on the axle 32 and covers the disc 30 and is pressed resiliently upon the disc to act as a brake by means of a spring 41 loaded by means of adjusting nuts 42 on the threaded axle 32. A downwardly directed lip 43 upon the guard deflects the chips in a safe direction as they are discharged from the saw teeth. The braking action upon the disc is of importance in ensuring a dragging of the disc teeth upon the faces of the saw teeth to clear the chips.

The spring 41 also allows the disc to lift if any chips should jam under the disc in the tooth spaces of the saw.

Rotation of the guard 40 with the disc 30 is prevented by the provision on the former of jaws 44, which engage a projection 45 on the plunger guide 38, the depth of the jaws allowing for any endwise movement of the plunger 34.

It will be obvious that the same technical effect could be obtained by a disc having teeth on its face instead of on its edge as described, and such a construction would naturally fall within the scope of this invention.

In another modified construction shewn in Figures 10 and 11, a chip remover is employed in the form of a finger 46 which constitutes a lateral projection on a spindle 47. The latter is mounted in a guide 48 in which it is free to rotate and move endwise, its axis being substantially parallel to the saw-axis B and situated somewhat beyond the periphery of the saw A. The projecting finger 46 is adapted to lie in the spaces between the saw teeth C and its end 49 is bent to reach into their corners. The guide 48 extends beyond the attachment of the finger 46 to the spindle 47 and has in it a spiral cam slot 50 through which the finger 46 extends so that angular movement of the latter causes it also to move laterally, the spindle 47 moving with it endwise against a spring 51 contained in its guide. The axial length of the slot 50 is sufficient to allow the finger 46 to move completely across the saw teeth C and beyond their side faces.

In action the finger 46 is by the spring 51 normally thrust over to that end of the slot 50 seen to the right in Figure 11 and in this position the bent end 49 of the finger 46 engages the saw teeth, and by inspection of Figure 10 it will be seen that it is thereby caused to turn angularly, and is given relative motion from the root to the tip of the saw teeth. As the finger 46 turns angularly, so also, by the action of the cam slot 50, it moves across the face of the saw tooth until it eventually leaves the face, rides along the side of the moving tooth and by the action of the spring 51 is thrust into the space behind it to repeat on the next tooth the actions just described.

In Figures 12 and 13, the chip-clearing device is in the form of a lantern pinion 52, of any suitable known form, which meshes with the saw teeth C and is mounted on a rotatable shaft 53 having its axis substantially parallel with the saw axis. The teeth 54 of the lantern pinion are so spaced and proportioned as to enter the tooth spaces and drag along the lower parts thereof, and eventually to move from the roots to the points of the teeth, clearing them of chips in the process. For the more effective action of the teeth 54 it is advantageous that a certain amount of frictional resistance should be offered to the rotation of the pinion 52. This resistance is conveniently obtained by causing the end face of the pinion to press upon the adjacent end of the housing 55 which supports the pinion shaft 53. To vary this pressure at will a spring 56 is employed whose loading can be varied by means of the adjusting nuts 57 on the end of the shaft 53. The latter has upon it a collar 58 which is endwise free to receive the spring pressure and transmit it to the end of the shaft bearing 59. To increase the frictional resistance the cooperating faces of the pinion 52 and housing 55 may be coned as shewn in Figure 13.

What I claim as my invention and desire to secure by Letters Patent is:—

1. The combination of a saw having teeth and a device adapted to enter the spaces between the said teeth and to traverse the cutting faces thereof.

2. The combination of a saw having teeth and a device actuated by the saw and adapted to enter the spaces between the said teeth and to traverse the cutting faces thereof.

3. The combination of a saw having teeth, a revolving member, projections on said member adapted to enter the spaces between said teeth and to traverse the cutting faces thereof.

4. A device for removing chips from metal-cutting saws, comprising a revolving disc operatively connected to the saw and provided with projections which are adapted to enter the tooth spaces of the saw.

5. A device for removing chips from metal-cutting saws as claimed in claim 4 in which the revolving member is in the form of a lantern pinion which derives its motion from the engagement of its teeth (54) with the saw teeth.

6. A device for removing chips from metal-cutting saws as claimed in claim 4 in which the revolving member is in the form of a lantern pinion which derives its motion from the engagement of its teeth with the saw teeth, including a braking means for retarding the motion of the said pinion.

In testimony whereof I have signed my name to this specification in the presence of two subscribing witnesses.

PERCY VENABLES VERNON.

Witnesses:
H. T. HARRISON,
H. A. DRANE.